June 25, 1946.  R. V. SUTHERLAND  2,402,929
PHOTOGRAPHIC PRINTING MECHANISM
Filed Oct. 23, 1944
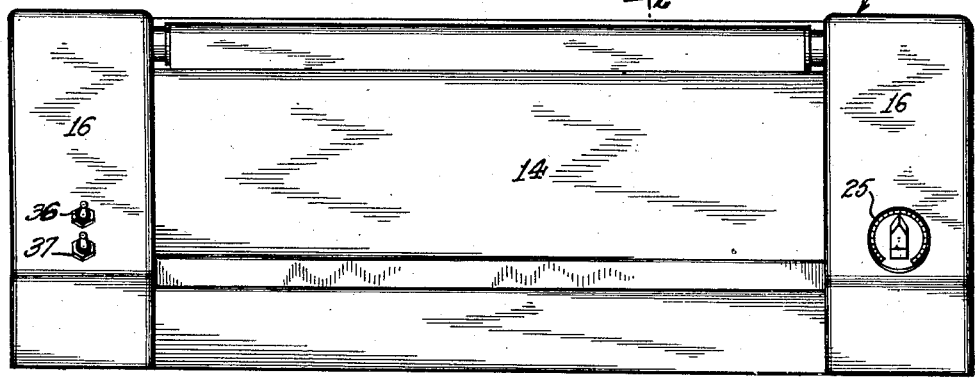
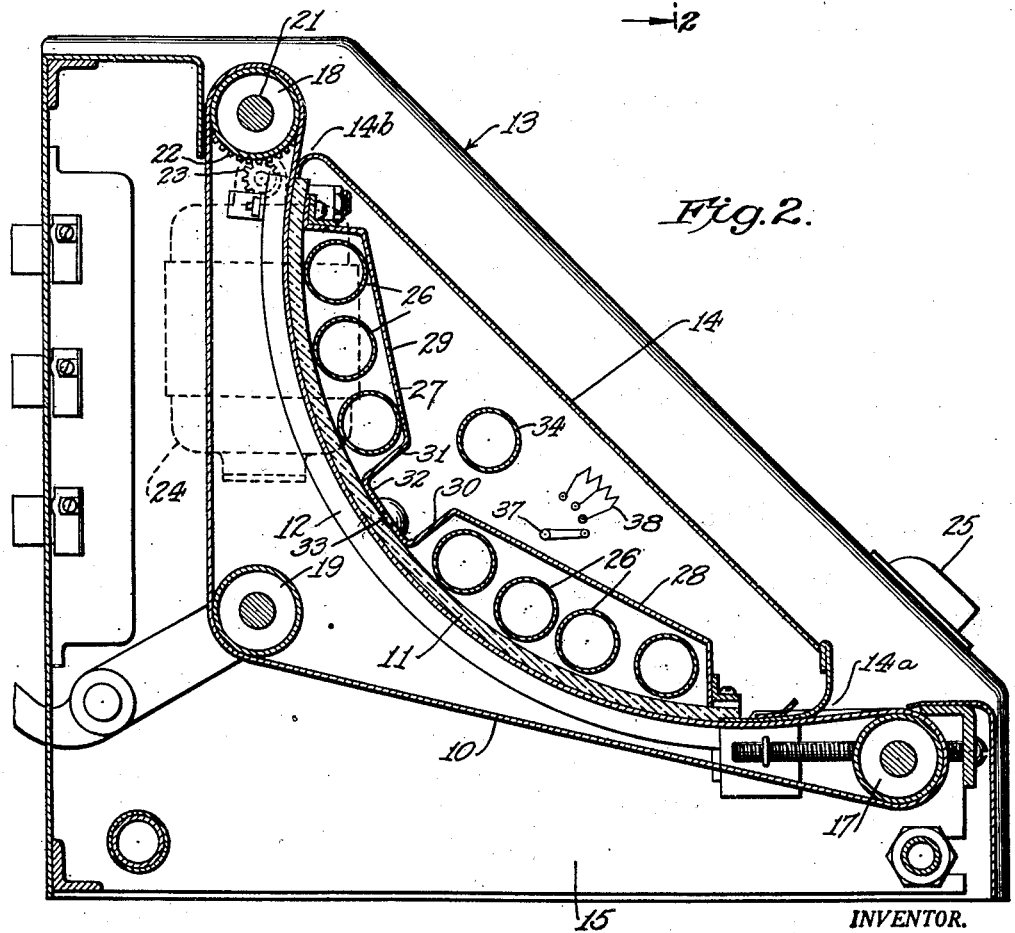
INVENTOR.
RICHARD V. SUTHERLAND
BY
*Hogue, Henry & Campbell*
*his* ATTORNEYS Patented June 25, 1946

2,402,929

UNITED STATES PATENT OFFICE 2,402,929

PHOTOGRAPHIC PRINTING MECHANISM

Richard V. Sutherland, Palatine, Ill., assignor to Charles Bruning Company, Inc., New York, N. Y., a corporation of New York Application October 23, 1944, Serial No. 559,906

7 Claims. (Cl. 95—75)

This invention relates to apparatus for printing on sensitized material such as paper, and more particularly to contact printing apparatus.

An object of the invention is to provide a contact printer, in which the originals and the print material are fed continuously therethrough, with means for making photographic prints as the material is fed through the machine.

Another object of the invention is to provide a contact printer adapted to produce both photographic prints and diazo and like prints.

A further object of the invention is to provide a printer for making both diazo and like prints and photographic prints in which all such prints will have very good definition.

Yet another object of the invention is to provide a printer for producing both photographic and other prints, and for minimizing the effect of lag of the originals with reference to the photographic prints in passing through the printer.

Still another object of the invention is to provide a printer for producing both photographic and other prints, in which the photographic printing is effected by throwing a narrow transverse band of light on the original to print therethrough on the sensitized material such as paper.

A further object of the invention is to provide a contact printer for producing both photographic and other prints, in which the photographic printing is effected by supplying the light therefor through a very narrow aperture close to the path of the original and the print.

According to an approved manner of carrying out the invention the originals and sensitized sheets are moved along the convex face of a curved plate of glass or other transparent material. At the concave side of the plate, there may be arranged illuminating means, preferably fluorescent, for throwing on the sensitized material light of a proper character to effect such printing, reflecting means being provided back of the illuminating means. In addition, there may be provided separate illuminating means preferably fluorescent, for photographic printing, and shielding means with a narrow aperture through which the light for such printing may pass.

This narrow aperture is an important feature, in that in sliding-contact printers of the same general character, the original tends to lag behind the print due to contact with the glass plate. When the print is exposed in a short length through the narrow aperture, the effect of the lag is reduced substantially and the photographic prints have good definition.

Further objects, features and advantages will appear upon consideration of the following detailed description and of the drawing, in which Figure 1 is a view in front elevation of one embodiment of the invention; and Figure 2 is a sectional view taken along the line 2—2 of Figure 1, but on a much larger scale.

Referring to the drawing, there is described a contact printer embodying an approved embodiment of the invention. The originals from which prints are to be made and the sensitized material on which prints are to be made, are fed by a traveling endless contact band 10 along the convex face of a curved transparent plate 11.

The apparatus preferably includes a casing 13 of suitable sheet material and having a downwardly sloping front 14 which constitutes an adequate print and tracing return tray. Adjacent the lower edge of said front 14 there is an entrance 14a for the material and adjacent the upper edge there is an exit 14b. The casing is provided with a frame comprising ends 15 located in side portions or ends 16 of said casing 13. The transparent plate 11 is supported in frame ends 15 in any suitable manner and is cushioned by means of strips of felt 12 interposed between the plate 11 and the frame ends 15.

In traveling along the convex surface of the plate 11, the endless band 10 passes from a bottom roll 17 to and over a drive roll 18 at the top of the sloping front 14. From drive roll 18, the endless band 10 passes around a tension roll 19 and back to bottom roll 17. The drive roll 18 is fixed on a shaft 21 journaled in said frame ends 15 and driven by means of a drive roll gear 22 fixed on shaft 21. Said gear 22 meshes with a gear 23 of a motor assembly, including a motor 24 which may afford an approximately six-to-one speed ratio. The period of exposure and consequently the density of the print may be varied as by changing speed of the motor. For such regulation the motor 24 may be controlled by a rheostat 25 (Figure 1).

The present invention relates more particularly to means for producing and controlling the illumination so as to produce the desired effects. More specifically, the invention relates to means for producing both photographic and other prints.

In the illustrative form of apparatus a plurality of lamps 26 preferably fluorescent are positioned in close juxtaposition to the concave face of plate 11 and are arranged in two spaced groups. Behind these lamps is a shield 27 having reflector sections 28 and 29 cooperating with said groups. At their outer edges these sections 28 and 29 are extended to the concave surface of plate 11. At the inner edges of sections 28 and 29 is a central trough formed by walls 30 and 31 extending substantially to the concave face of plate 11 and connected by a wall 32 having a very narrow transverse slot or aperture 33 close to the plate. This aperture is provided for use with a photographic lamp 34 spaced from said aperture. Preferably, the lamp 34 is of a fluorescent type. At this point it may be said that the coatings of the fluorescent lamps should have spectral emissions coinciding closely with the spectral sensitivity of the sensitized material on which the prints are made.

In the present apparatus, the seven fluorescent lamps 26 are preferably coated with a phosphor which peaks at 3,600 A. (Angstrom units) and whose spectral emission coincides very closely with the spectral sensitivity of the diazo material so that prints may be made on this material at a good rate.

The photographic lamp 34 is preferably a standard lamp, having a color temperature of 3,500° Kelvin although substantially any fluorescent lamp, except the 3,600 Angstrom lamp, may be used.

In printing with lamps 26, the sensitized material, for example, a diazo type paper, may be exposed for the period required for passing along the entire length of plate 11, and the exposure period can be controlled adequately by adjusting the motor drive.

The variation in light requirements for printing with different types of sensitized material and different types of originals is greater than can be taken care of by the approximately six-to-one speed ratio afforded by motor 24, particularly in view of the very short exposure for any part. To meet this requirement, the kind and the intensity of the light may be varied as by means of a two position switch 38, and the three position switch 37. The switch 38 turns on the lamps 26 and the motor 24. In its other position, it turns on the lamp 34 and the motor 24.

The switch 37 is connected with a tapped resistance 36 so that it may be used to vary the intensity of the lamp 34.

In making a photographic print the lamp 34 exposes a narrow strip of the sensitized material as it passes by the aperture or slot 33 at a part of the contact glass 11 where there will normally be the maximum contact or pressure.

This narrow slot 33 which may be about one quarter of an inch in width, is used to obtain sharp definition in a photographic print.

It has been found that considerable difficulty is encountered in making sharp prints with continuous printers of the type in which the original and the print are slid over a glass surface for the reason that the print tends to shift relatively to the original. The original adheres more to the glass than to the print and as a consequence they slip relatively and the original lags behind. In extreme cases there may be as much as one-sixteenth of an inch slippage between the print and the original over the entire length of a thirteen inch long contact glass.

Where the print and original are exposed through the slot 33, the slippage during the passage of the original and the print past the slot 33 would be about one eight hundredth of an inch. The prints therefore would have sharp definition.

It will be evident from the foregoing description that the contact printer of the present invention has many advantages over those of the prior art including ability to be used with a wide variety of photosensitive materials and to produce prints of sharp definition.

It should be understood that many changes may be made and that various features may be used without others, without departing from the true scope and spirit of the invention.

I claim:

1. A contact printing mechanism in which material to be copied and sensitized material are fed therethrough, comprising a transparent member for receiving material to be copied and a sensitized material, means for moving the material along said member, a first light source for illuminating substantially all of the transparent member, said light source emitting light rays of a given character, a second light source emitting light rays of a different character, shielding means formed with an opening extending transversely of the direction of movement of said material, and means for mounting the second light source behind said opening with a portion of the shield between it and the first light source for shielding the transparent member from said second light source except at a narrow zone extending transversely to the direction of movement of said material.

2. The mechanism of claim 1 in which the first light source comprises at least two spaced apart lamps and the second light source is interposed between said spaced apart lamps and shielded therefrom.

3. The combination with a curved and transparent contact plate and an endless contact band traveling along the convex face of said contact plate to feed material to be exposed and sensitized material along said convex face, of illuminating means for printing comprising a plurality of lamps in close juxtaposition to the concave side of said plate, and illuminating means for photographic printing comprising a shield confining light from said first mentioned illuminating means and having a narrow aperture close to said contact plate, and a photographic lamp spaced from said plate and positioned to shine through said aperture on said material as it passes thereacross.

4. In a contact printing mechanism having a curved and transparent contact plate and an endless contact band traveling along the convex face of said contact plate to feed material along said convex face, the combination of illuminating means for printing comprising two spaced groups of lamps in juxtaposition to the concave face of said plate, a photographic lamp opposite the space between said groups and spaced from the concave surface of said contact plate, a shield of sheet-like material extending across the front of said groups to provide reflectors for the lamps of said groups, and a central trough in said shield with a bottom close to said plate and having a narrow slit extending transversely of the path of the material.

5. In a contact printer in which material to be copied and sensitized material are fed continuously therethrough between the convex face of a curved transparent contact element and an endless contact band traveling over at least a portion of said convex face, illuminating means comprising a first lamp spaced from an intermediate part of the concave face of said contact element over which the band passes, a shield for said first lamp provided with a narrow transverse aperture adjacent the said intermediate part of the contact element groups of lamps for other printing located in juxtaposition to said contact element and at opposite sides of the apertured part of said shield, and means on the shield lying between the first lamp and said groups of lamps to separate the first lamp from the said groups of lamps.

6. The combination set forth in claim 5 in which the lamps of said groups are fluorescent and coated with a material whose spectral emission coincides closely with the spectral sensitivity of the sensitized material on which the prints are made.

7. The combination set forth in claim 5 in which the first lamp is a fluorescent white lamp having a color temperature of substantially 3500° and the lamps in said groups are fluorescent lamps coated with a phosphoric compound which peaks at substantially 3600 A, and whose spectral emission coincides very closely with the spectral sensitivity of diazo paper.

RICHARD V. SUTHERLAND.